UNITED STATES PATENT OFFICE 2,077,512

POROUS BODY

Hans Buchloh, Leverkusen-I. G. Werk, Germany, assignor, by mesne assignments, to Pen-Chlor, Inc., Philadelphia, Pa., a corporation of Delaware No Drawing. Application July 7, 1934, Serial No. 734,235. In Germany July 12, 1933

2 Claims. (Cl. 210—205)

This invention relates to improvements in the manufacture of porous bodies suitable as filters.

In accordance with the present invention the manufacture of filters, as, for instance, filter stones, filter plates or complete filter dishes, is very much improved by mixing a solid granular filter ground-mass with the necessary amount of an organic cement which is self-hardening at ordinary temperature, and then shaping the mass.

Hitherto, filter stones have generally been made by mixing substances of a suitable granulation with organic cements, shaping the material (for instance in a prismatic form), and then burning the stones at high temperatures. It has also been proposed to use condensation products of phenol with formaldehyde as binding materials instead of inorganic cements. In order to obtain good mechanical and chemical properties, the stones prepared in this manner must, however, be "baked" at about 200° C.

This invention is based on the discovery that filter stones and layers with good mechanical properties and every desired porosity and permeability can be made without using any "baking" or burning process. For this purpose such organic substances are used as cements which are self-hardening at ordinary temperatures (atmospheric temperature), for example resins of the phenol-formaldehyde type (e. g. the liquid condensation product of phenol with formaldehyde in the so-called A-state of condensation), containing moreover a substance capable of promoting the hardening process, as for instance p-toluene sulfochloride, oxalic acid, or neutrally reacting metal oxides; self-vulcanizing rubber and rubber-like mixtures can also be employed. By "self-hardening" is here meant the capacity of the organic cementing substances to harden, at atmospheric temperatures and without the air of heating, within a period of about 24 hours.

On the other hand, granular substances, for example quartz sand, pumice stone sand, or granulated ceramic matter (e. g. stoneware), may be used as ground-material according to this invention.

In this manner, by using chemically inert substances both as ground-mass and as cement, there can be made filter stones and filter plates which are not attacked by the liquids to be filtered. Naturally, the components must be selected in a suitable manner for any given purpose. In this respect it has been found that, sometimes, employing an inert ground-mass is of minor importance because its granules are imbedded in the cement and so protected from being attacked by the liquids to be filtered.

If high stability of the filter stones or plates is required, the granulated substance or the cement may be mixed with substances as siliceous white, heavy spar, clay, etc. The layer of the cement coating the single grains thereby becomes thicker and tougher and the filter stones or plates more compact, but, however, less permeable.

This invention shows the further advantage that the filters can be made jointless in one piece and at the very place where they are used, and are not to be formed out of single stones. It is also possible to make filters of complicated structure.

In order to prepare a filter at the place of its subsequent use, the self hardening mixture may be applied on a supporting frame, the open spaces of which are filled with easily soluble or easily melting substances in such a manner that a plane surface results. Filling materials are for example common salt and other easily soluble salts, or paraffin and other easily melting substances. After the mixture has been spread on the said surface and hardened, the filling material is dissolved or melted out of the remaining frame. It is also possible, however, to fill up the open spaces of the frame with rubbles, gravel, coarse sand and the like, or, on the other hand, to omit the frame altogether.

Furthermore, a filter plate can be made by constructing a frame work of laths, bars or the like on a plane foundation and then imbedding the said frame work in the self-hardening mixture. By this method, filter plates of considerable diametre can be made which are very firm in consequence of the strengthening brackets contained therein.

The following examples illustrate the invention:—

Example 1

Quartz sand of a grain size of less than 2 mm. is mixed with such a quantity of a mixture of neutral liquid phenol formaldehyde resin (in the first state of condensation, the so-called A-state), p-toluene sulfochloride and quartz powder that the resulting paste is not too viscous and can still be shaped. The stones made in this way show a permeability of 17.3 litre/min./dcm.$^2$ for air at a pressure difference of 100 mm. water column.

Example 2

200 parts by weight of quartz sand are mixed with 6 parts by weight of barium oxide, and to this mixture are added 70 parts by volume of a still liquid condensation product of cresol with formaldehyde. The mass is shaped in the intended form and after hardening represents a porous body suitable for filtering purposes. Instead of barium oxide, also about the same quantity of oxalic acid can be advantageously used.

Example 3

On the bottom of a vessel which is to be provided with a filter plate, a frame-like stone support is erected in such a manner that the formed open spaces communicate by channels. The open spaces are then filled with common salt which is compressed by stamping to such a degree that it will resist to the pressure occurring afterwards when the filter plate itself is stamped.

A plane surface having thus been prepared, the necessary quantity of sand, the grains of which pass a screen of 400 meshes per cm.$^2$ and do not pass a screen of 900 meshes per cm.$^2$, is moistened with 10% of its weight of the pre-condensed, still liquid condensation product of phenol and formaldehyde which has been intimately mixed beforehand with 10% of its weight of benzene sulfochloride. In order to thoroly mix the resulting mass, it is necessary to pass it through a screen of 16 meshes per cm.$^2$. The mixture is then homogeneously spread on the above mentioned plane surface and levelled and stamped. After hardening of the filter plate, the common salt is dissolved by washing with water, whereupon the filter is ready for use.

In the following claims the term "liquid to plastic" is intended to mean that the organic cementing substance is in such a state of condensation or polymerization respectively that it has still adhesive power and is still mouldable in the mixture with the inorganic granular material.

I claim:—

1. In the process for the manufacture of porous bodies suitable for filtration the steps which comprise mixing an inorganic solid inert granular material of the group consisting of pumice stone sand, granulated ceramic matter and quartz sand with a mixture of the still liquid to plastic condensation product of a phenol and formaldehyde in the so-called A-state of condensation with a hardening agent of the group consisting of oxalic acid, a reactive metal oxide, benzene sulfochloride and p-toluene sulfochloride, the ingredients of the latter mixture being present in such proportions that the same is self-hardening at atmospheric temperatures and without heating within a period of about 24 hours, shaping the resulting mass and allowing it to harden.

2. Porous bodies suitable as filters, being shaped coherent masses consisting essentially of an inorganic solid inert granular material of the group consisting of pumice stone sand, granulated ceramic matter, and quartz sand the particles of which are cemented together into a coherent mass by means of a self-hardened condensation product of phenol, formaldehyde and a hardening agent of the group consisting of oxalic acid, a reactive metal oxide, benzene sulfochloride, and p-toluene sulfochloride.

HANS BUCHLOH.